(12) United States Patent
Zhang et al.

(10) Patent No.: US 12,422,993 B2
(45) Date of Patent: Sep. 23, 2025

(54) DATA READING AND WRITING METHOD, SYSTEM AND CONTROL METHOD

(71) Applicant: Lenovo (Beijing) Limited, Beijing (CN)

(72) Inventors: Xuhui Zhang, Beijing (CN); Ming Jin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/603,208

(22) Filed: Mar. 13, 2024

(65) Prior Publication Data
US 2024/0319883 A1 Sep. 26, 2024

(30) Foreign Application Priority Data

Mar. 24, 2023 (CN) .......................... 202310298473.3

(51) Int. Cl.
*G06F 3/06* (2006.01)
*G06F 13/42* (2006.01)

(52) U.S. Cl.
CPC .......... *G06F 3/0613* (2013.01); *G06F 3/0659* (2013.01); *G06F 3/067* (2013.01); *G06F 13/4221* (2013.01); *G06F 13/4282* (2013.01); *G06F 2213/0026* (2013.01); *G06F 2213/0032* (2013.01)

(58) Field of Classification Search
None
See application file for complete search history.

(56) References Cited

U.S. PATENT DOCUMENTS

2014/0297939 A1* 10/2014 Perego ................ G06F 13/1694
711/105

* cited by examiner

*Primary Examiner* — Brian R Peugh
(74) *Attorney, Agent, or Firm* — ANOVA LAW GROUP, PLLC

(57) ABSTRACT

A data reading and writing method includes: after a first electronic device establishes a first communication connection with a second electronic device, controlling a first storage component of the first electronic device to switch to a first usage mode in response to obtaining a target data reading/writing task from a third electronic device, in the first usage mode, the second electronic device being configured to transmit a first part of target data between the first storage component and the third electronic device; transmitting a second part of the target data between a second storage component of the first electronic device and the third electronic device using a second communication connection between the first electronic device and the third electronic device; and after completing the target data reading/writing task, controlling the first storage component to switch back to a second usage mode.

18 Claims, 11 Drawing Sheets

DATA READING AND WRITING METHOD, SYSTEM AND CONTROL METHOD

CROSS-REFERENCES TO RELATED APPLICATION

This application claims priority to Chinese Patent Application No. 202310298473.3 filed on Mar. 24, 2023, the entire content of which is incorporated herein by reference.

FIELD OF TECHNOLOGY

The present disclosure relates to the field of computer and, more specifically, to a data reading and writing method, system, and control method.

BACKGROUND

With the advent of the big data era, network attached storage (NAS, also known as network storage, which is a dedicated data storage server) devices have become indispensable processing devices at home. NAS devices can directly connect storage components through the network to realize data storage and management.

However, due to limited network bandwidth at home and restrictions on power consumption, the access speed of the NAS device is often affected, thereby reducing the data reading and writing speed of the storage component and affecting the user experience.

SUMMARY

One aspect of this disclosure provides a data reading and writing method. The method includes after a first electronic device establishes a first communication connection with a second electronic device, controlling a first storage component of the first electronic device to switch to a first usage mode in response to obtaining a target data reading/writing task from a third electronic device. In the first usage mode, the first storage component only has a data transmission channel with the second electronic device to cause the second electronic device to transmit a first part of target data between the first storage component and the third electronic device. The first part of the target data is a part of the target data required by the target data reading/writing task. The method further includes transmitting a second part of the target data between a second storage component of the first electronic device and the third electronic device using a second communication connection between the first electronic device and the third electronic device, the second part of the target data being a remaining part of the target data after removing the first part of the target data; and after completing the target data reading/writing task, controlling the first storage component to switch back to a second usage mode. The first storage component only has the data transmission channel with the first electronic device in the second usage mode.

Another aspect of the present disclosure provides a control method, which can be applied to a third electronic device. The method includes: after obtaining an operation of establishing a first communication connection between a first electronic device and a second electronic device, sending an obtained target data reading/writing task to the first electronic device and the second electronic device to cause a first storage component of the first electronic device to switch to a first usage mode. In the first usage mode, the first storage component only having a data transmission channel with the second electronic device to cause the second electronic device to transmit a first part of target data between the first storage component and the third electronic device. The first part of the target data is a part of the target data required by the target data reading/writing task. The method further includes reading or writing a second part of the target data in a second storage component of the first electronic device using a second communication connection with the storage component. The second part of the target data is a remaining part of the target data after removing the first part of the target data.

Another aspect of the present disclosure provides a data reading and writing system. The system includes: a first electronic device, the first electronic device having a first storage component and a second storage component; and a second electronic device, the second electronic device being configured to establish a first communication connection with the first electronic device, and establish a data transmission channel with the first storage component. When a target data reading/writing task is obtained from a third electronic device, the first storage component only has a data transmission channel with the second electronic device to transmit a first part of target data between the first storage component and the second electronic device through the second electronic device, the first part of the target data being a part of the target data required by the target data reading/writing task. The first electronic device is configured to establish a first communication connection with the third electronic device to transmit a second part of target data between the second storage component and the third electronic device, the second part of the target data being a remaining part of the target data after removing the first part of the target data. After completing the target data reading/writing task, the first electronic device is configured to control the first storage component to only have the data transmission channel with the first electronic device.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Figure 1:
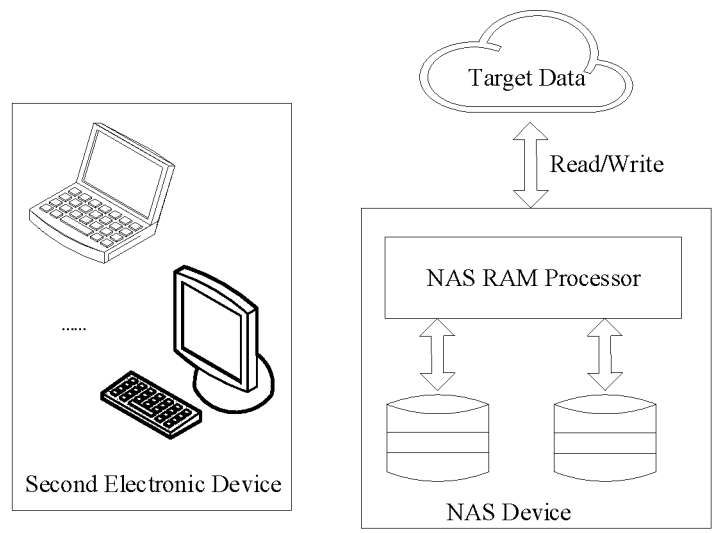
FIG. 1 is a schematic diagram of an application scenario of a data reading and writing method according to an embodiment of the present disclosure.

As shown in FIG. 1, a NAS device (hereinafter, for the convenience of description, the NAS device can be referred to as a first electronic device) is generally responsible for network storage of users' files and has a file transfer processing system. Through a data transmission channel, the received data such as network files are written into a first storage component and a second storage component (these two storage components can be hard disks, such as disk storage arrays) for backup storage.

However, since the network bandwidth of the NAS device may not be sufficient, data reading and writing speeds are affected. In addition, in the network environment where the NAS device is located, there are generally other electronic devices (hereinafter, for the convenience of description, these electronic devices can be referred to as second electronic devices) with data processing and transmission capabilities, such as computers with x86 systems, etc. However, there is generally no connection between the second electronic devices and the first electronic device, and the second electronic devices generally do not participate in the transmission of the network files, therefore, other data transmission channels in the network environment cannot use to achieve the purpose of improving data reading and writing speeds.

In some embodiments of the present disclosure, the idle data processing capabilities of the second electronic devices with data processing and transmission capabilities (such as idle data transmission channels and computing capabilities) in the network environment where the first electronic device is located can be fully utilized to increase the reading and writing speed of the first electronic device and avoid idle waste of resources. More specifically, in the present disclosure, to-be-transmitted data (such as target data to be read or written) can be split into two parts and transmitted to different storage components through different data transmission channels. In this way, the first storage component can be controlled to only form a data transmission channel with the second electronic device thereby transmitting part of the target data received by the second electronic device to the first storage component, making full use of the idle computing power and data transmission capability of the second electronic device. During this period, the first electronic device can transfer another part of the target data to the second storage component. This implementation of split transmission improves data transmission efficiency.

Subsequently, the first electronic device can control the first storage component to only form a data transmission channel with the first electronic device such that the first electronic device can perform data reconstruction on another part of the target data based on part of the target data respectively stored in the first storage component and the second storage component. In this way, both storage components can store complete target data, thereby achieving the effect of target data backup storage.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 2:
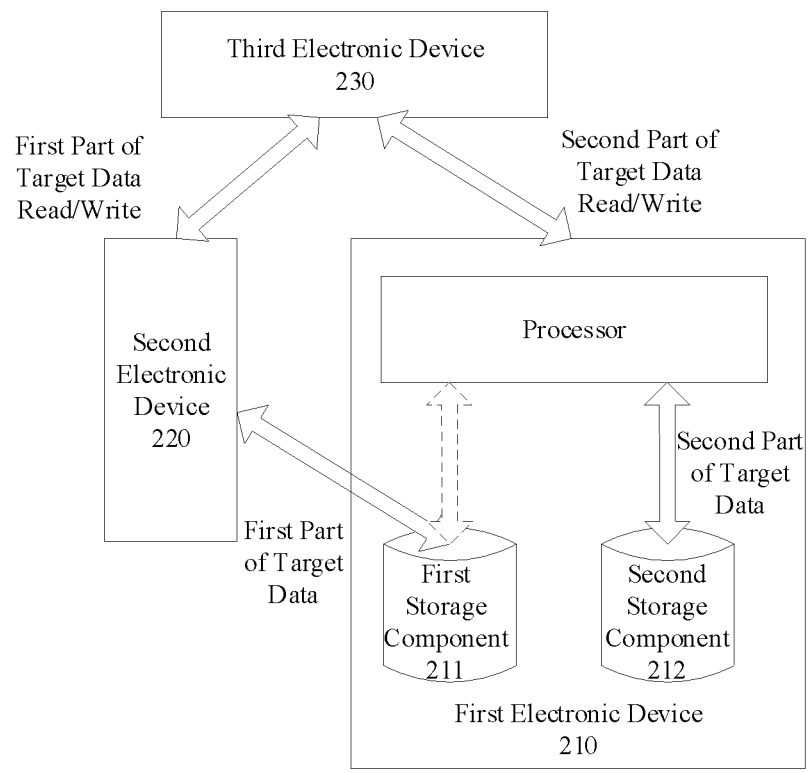
FIG. 2 is a schematic structural diagram of the data reading and writing system according to an embodiment of the present disclosure.

FIG. 2 is a schematic structural diagram of the data reading and writing system according to an embodiment of the present disclosure. The system includes a first electronic device 210 and a second electronic device 220.

The first electronic device 210 includes a first storage component 211 and a second storage component 212. Both the first storage component 211 and the second storage component 212 may be used to store data from a third electronic device 230. In the actual application of the present disclosure, the first storage component 211 and the second storage component 212 may be storage components of the same structure, such as hard disks, magnetic disks or other types of memories. Of course, these two storage components may also have different structures or may be different types of memories. The respective device types and structures of the first storage component 211 and the second storage component 212 are not limited in the embodiments of the present disclosure.

In some embodiments, redundant arrays of independent disks (RAID) can be used to deploy multiple storage components in the first electronic device. That is, the first storage component 211 and the second storage component 212 may be magnetic disks. In practical applications, data redundancy can be achieved through disk data mirroring such that data stored on the first storage component 211 and the second storage component 212 ser as backup data for each other.

In the embodiments of the present disclosure, the first electronic device 210 may be a NAS device, and the first storage component 211 and the second storage component 212 may constitute its storage system. Through a set of configured file transfer processing systems, data from the third electronic device 230 may be transferred to the storage systems for storage. The first electronic device 210 generally also includes a processing component, such as an ARM processor, a general-purpose processor, an application-specific integrated circuit, a field-programmable gate array or other programmable logic devices and other processors, to execute the data reading and writing method proposed in the present disclosure to complete data reading and writing operations on any storage component in the storage system. For the implementation process, reference can be made to the description of the corresponding part of the method embodiment below.

The second electronic device 220 may include, but is not limited to terminal devices such as laptop computers, desktop computers, industrial computers, smart medical or transportation equipment. The second electronic device 220 may have an independent file transfer processing system, which is different from the file transfer processing system of the first electronic device 210. The present disclosure does not limit the types of these two systems, which can be determined based on the configuration of these two electronic devices.

In practical applications, the first electronic device 210 and the second electronic device 220 may be independent devices, or they may be deployed in the same housing. For example, a NAS device (i.e., the first electronic device 210) may be integrated into a computer (i.e., the second electronic device 220). At this time, the first electronic device 210 and the second electronic device 220 may be two systems of the same electronic device, such as a NAS device running an ARM system and a computer running an x86 system. The present disclosure does not limit the deployment relationship between the first electronic device 210 and the second electronic device 220, which can be determined based on actual needs.

In the embodiments of the present disclosure, the second electronic device 220 may establish a first communication connection with the first electronic device 210. The specific communication method is not limited in the present disclosure. In addition, in some application scenarios, the second electronic device 220 may establish a data transmission channel with the first storage component 211. In this way, in a data writing task in which the third electronic device 230 needs to write the target date into the first storage component 211 and the second storage component 212, in order to increase the data transmission speed, in the present disclosure, the target data can be split into a first part of target data and a second part of target data, which can be determined based on the respective data transmission capabilities of the first electronic device 210 and the second electronic device 220. For the implementation process, reference can be made to the description of the corresponding method embodiment below.

When performing the target data writing task described above, the first electronic device 210 may control the first storage component 211 to only have a data transmission channel with the second electronic device 220. The second electronic device 220 receives the first part of the target data from the third electronic device 230 and then transmits it to the first storage component 211 for storage. In this way, the first part of the target data can be transmitted between the first storage component 211 and the third electronic device 230 through the second electronic device 220, which makes full use of the idle resources of the second electronic device 220 to construct a data transmission channel that is different from the original data transmission channel of the first electronic device 210 to realize the transmission of a part of the to-be-written target data.

At the same time, the first electronic device 210 can establish a second communication connection with the third electronic device 230 to transmit the second part of the target data between the second storage component 212 and the third electronic device 230, and utilize the data transmission capability of the first electronic device 210 to realize the transmission of the second part of the target data. In this way, in the network environment where the first electronic device 210 is located, the second electronic device 220 with idle data transmission capability can form a new data transmission channel for the target data with the first storage component 211 such that different parts of the target data can be transmitted through multiple data transmission channels. Compared with using only one data transmission channel of the first electronic device itself, the method of transmitting the target data to its own storage system can realize full utilization of the space resources of other electronic devices in the network environment where the first electronic device is located, which greatly improves the target data transmission efficiency.

After determining that the target data writing is completed, the first electronic device 210 may control the first storage component 211 to only have a data transmission channel with the first electronic device 210. In this way, the first electronic device 210 can reorganize the partial target data stored by the first storage component 211 and the second storage component 212 respectively such that the tow storage components can store the complete target data, thereby realizing data backup and storage. For the implementation process, reference can be made to the description of the corresponding method embodiment below.

Similarly, in a scenario where the target data needs to be read from the first storage component 211 and/or the second storage component 212, that is, when performing the target data reading task, since the complete target data is stored in both the first storage component 211 and the second storage component 212, different parts of the target data can be read from these two storage components based on certain rules to form the complete target data. In this way, based on the method described above, different parts of the target data can be read by the first electronic device 210 and the second electronic device 220 respectively, and uploaded to the third electronic device 230 (i.e., the reading device that needs to read the target data) through respective data transmission channels. The third electronic device 230 can reorganize each part of the received target data to obtain the to-be-read target data. Compared with the data reading method that only reads the target data through the first electronic device 210, the data reading and writing method of the present disclosure greatly improves the reading efficiency.

As described above, it should be understood that by default, both the first storage component 211 and the second storage component 212 can have data transmission channels with the first electronic device 210. When performing the target data reading/writing task, the first storage component 211 can be controlled to disconnect the data transmission channel with the first electronic device 210 based on the method described above such that the first electronic device 210 only has a data transmission channel with the second electronic device 220. The present disclosure does not limit the implementation of the control method, which can be set based on actual needs.

Figure 3:
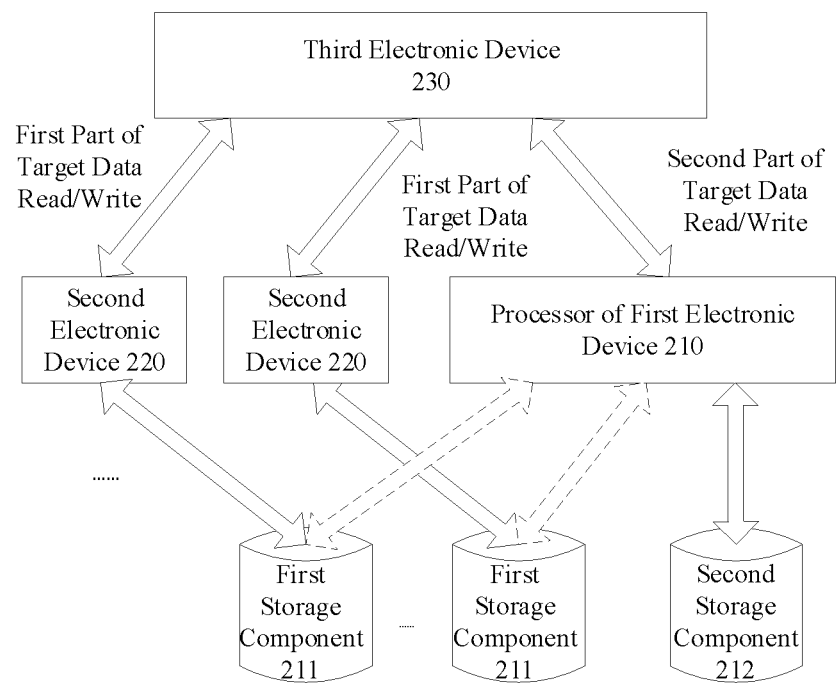
FIG. 3 is a schematic structural diagram of the data reading and writing system according to an embodiment of the present disclosure.

In addition, in the data reading/writing system in the present disclosure, there can be one or more second electronic device 220 can be one or more, and the number of the second electronic devices 220 can be determined based on the actual situation of the target data reading/writing task. For example, the amount of target data to be read/written may be relatively large, and/or other electronic devices in the network environment where the first electronic device 210 is located (such as a home LAN or a LAN in other specific environments) may have fewer free resources, etc., a second electronic device 220 may be selected to implement the data reading and writing task based on the method described above, or multiple second electronic devices 220 may be selected (which can be the same or different types of terminal devices). As shown in FIG. 3, the plurality of second electronic devices 220 correspond to the plurality of first storage components 211 to form a plurality of data transmission channels, thereby meeting the read/write task of target data with a relatively large mount of data and enring task performance efficient. For the implementation process, reference can be made to the description of the corresponding method embodiment below.

Figure 4:
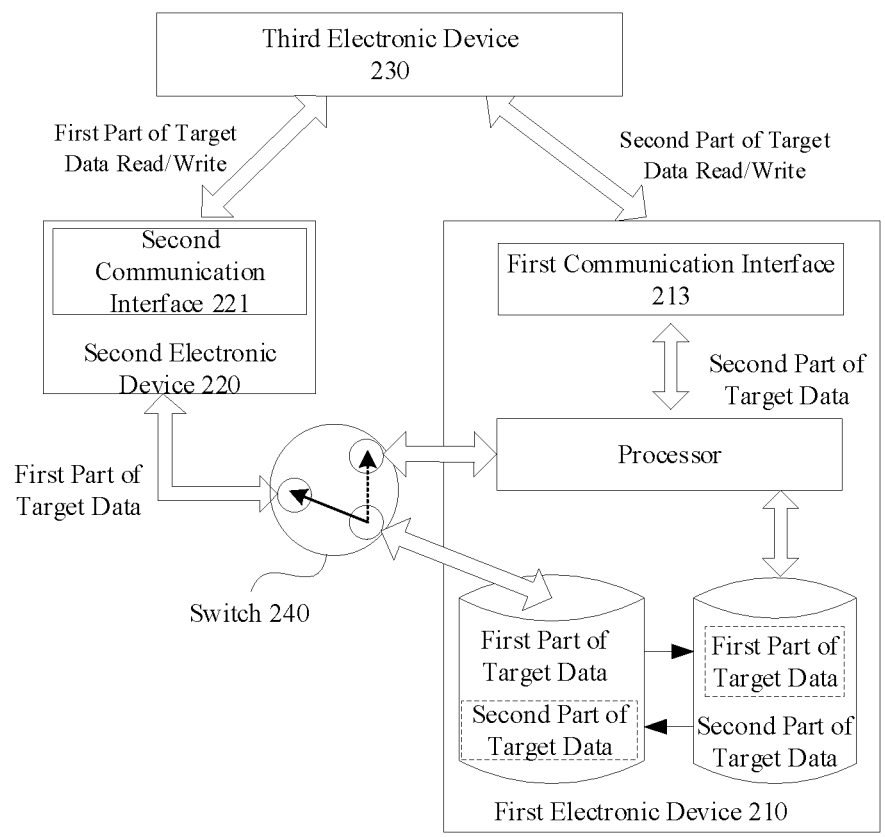
FIG. 4 is a schematic structural diagram of the data reading and writing system according to an embodiment of the present disclosure.

Based on the above description, in order to realize the formation of a data transmission channel between the first storage component 211 and the first electronic device 210 or the second electronic device 220 in different scenarios, as shown in FIG. 4, the data reading and writing system in the present disclosure may also include a switch 240 arranged between the first electronic device 210, the first storage component 211, and the second electronic device 220. By controlling the switch 240 to be turned on or off, the first data transmission channel between the first electronic device 210 and the first storage component 211, and the second data transmission channel between the first storage component 211 and the second electronic device 220 can be turned on or off. That is, switch 240 can be used to realize that one of the two data transmission channels is turned on and the other data transmission channel is turned off.

More specifically, as shown in FIG. 4, the fixed connection of the switch 240 can be connected to the corresponding first storage component 211, one selective connection of the switch 240 can be connected to the/201, and the other selective connection of the switch 240 can be connected to the second electronic device 220. When the selection component of the switch 240 is in different states (the solid line state and the dotted line state in FIG. 4 respectively represent different sates of the switch 240), the connection between the fixed connection and any selection connection can be realized. In this way, a corresponding data transmission channel can be formed between the first storage component 211 and the first electronic device 210 or the second electronic device 220. In some embodiments, the state control of the selection component of the switch 240 may be implemented by the first electronic device 210 or other devices. The control subject of switch 240 is not limited to the embodiments of the present disclosure.

It should be noted that FIG. 4 takes the switch 240 as a single-pole double throw switch as an example for description, but the switch 240 is not limited to the circuit structure shown in FIG. 4. Depending on the needs, a relay switch or other types of multi-channel selection circuits can be used, but the control methods for data reading and writing are similar and will not be described in detail in the present disclosure.

In order to realize data transmission between different electronic devices in the system, the data reading and writing system may also include a first communication interface 213 arranged at the first electronic device 210, and a second communication interface 221 arranged at the second electronic device 220. The first communication interface 213 may be configured to realize the data transmission between the first electronic device 210 and the third electronic device 230, and the second communication interface 221 may be configured to realize the data transmission between the second electronic device 220 and the third electronic device 230. For the implementation process, reference can be made to the corresponding part of the method embodiment below, which will not be described in detail here.

In some embodiments, the interface types of the first communication interface 213 and the second communication interface 221 may be determined based on the communication methods supported by the corresponding electronic devices, such as the data interfaces of wireless communication modules such as Wi-Fi modules, 5G/6G (fifth generation mobile communication network/sixth generation mobile communication network), GPRS modules, radio frequency communication modules, near field communication (NFC) modules, etc. Of course, the first communication interface 213 and/or the second communication interface 221 may also be wired communication interfaces that support the wired communication. In practical applications, the interface types of the first communication interface 213 and the second communication interface 221 may be the same or different. The respective interface types of the first communication interface 213 and the second communication interface 221 is not limited in the present disclosure, which can be set based on actual needs.

It should be understood that in the application scenario of the data reading and writing system as shown in FIG. 3, the switching control of the data transmission channel between each first storage component 211 and the first electronic device 210 and a different second electronic device 220 may be implemented by using the switch 240 shown in FIG. 4. In this way, the obtained system structure can be the connection between the switch 240 and the first electronic device 210 and the second electronic device 220 shown in FIG. 4, which will not be described in detail in the present disclosure.

In some embodiments, in order to establish the first communication connection between the first electronic device 210 and the second electronic device 220, the first electronic device 210 and the second electronic device 220 may establish the first communication connection through a first type of interface and a data cable. The first type of interface may include, but is not limited to, a peripheral component interconnection express (PCIE) interface, an external series ATA (eSATA) interface, or pins, etc., which can be determined based on the communication requirements of the first electronic device 210 and the second electronic device 220.

Figure 5:
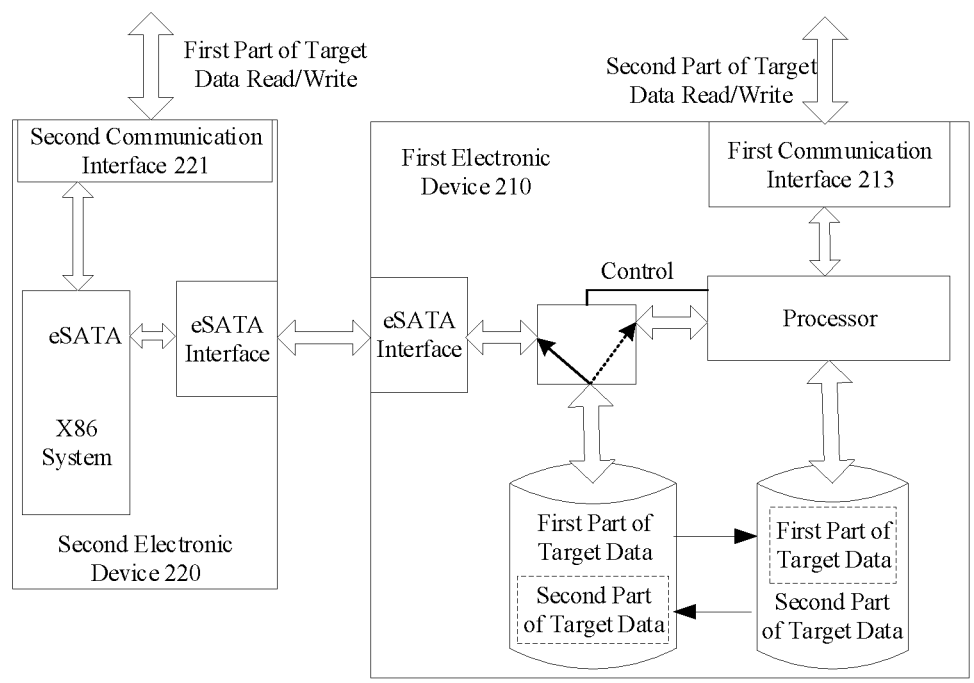
FIG. 5 is a schematic structural diagram of the data reading and writing system according to an embodiment of the present disclosure.

Based on the above analysis, in a scenario where the first electronic device 210 and the second electronic device 220 are two independent devices (that is, deployed in different chassis), at this time, both electronic devices can have their own systems. For example, the first electronic device 210 may be a NAS system, and the second electronic device 220 may be configured with an x86 system or other types of operating systems, with respective processors supporting system operation and executing data reading and writing methods on the corresponding side. As shown in FIG. 5, the storage component communication bus interface between the first electronic device 210 and the second electronic device 220, that is, the first type of interface, can be an eSATA interface, but is not limited to this type of interface. Combined with the description of the corresponding part of the context, when a data transmission channel is required between the second electronic device 220 and the first storage component 211 and the switch 240 is in the state shown in FIG. 5, the x86 system of the second electronic device 220 can be connected to the external eSATA interface. the eSATA interface is connected to the eSATA interface of the first electronic device 210, and the eSATA interface can be connected to the switch 240 to form a data transmission channel for transmitting the first part of the target data.

It should be noted that in a scenario where the first electronic device 210 and the second electronic device 220 are two independent devices, as shown in FIG. 5, the switch 240 can be deployed in the first electronic device 210 and controlled by a processor (such as a NAS RAM processor) of the first electronic device 210 to switch between different states. In some embodiments, the switch 240 may also be deployed on the second electronic device 220 or as an independent device. The present disclosure does not limit the deployment relationship between the switch 240 and the first electronic device 210 and the second electronic device 220, which can be set based on actual needs.

Figure 6:
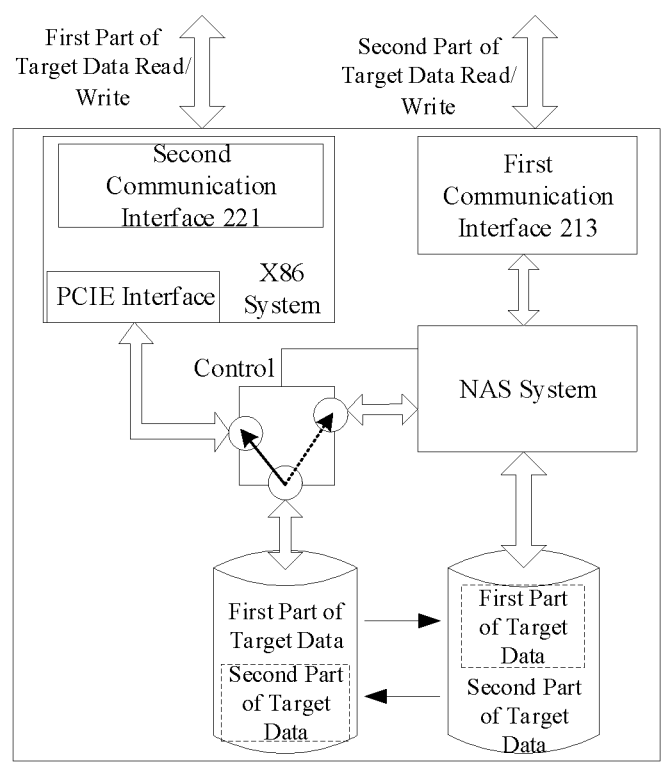
FIG. 6 is a schematic structural diagram of the data reading and writing system according to an embodiment of the present disclosure.

In some embodiments, the first electronic device 210 and the second electronic device 220 may also be deployed in the same chassis. In this scenario, the electronic device may be deployed with at least two systems, such as an NAS system and a x86 system. Of course, other types of systems may also be deployed. At this time, as shown in FIG. 6, the fist type interface that implements the first communication connection between the two systems is a PCIE interrace, but is not limited to the PCIE interface as pins can also be deployed to replace the first type of interface and the data cable. Correspondingly, the hard disk communication bus between the two systems can be the PCIE bus. In this scenario, the switching control between different states of the switch 240 may be controlled by the system of the first electronic device 210 (such as a NAS system), but is not limited thereto. For the data reading and writing process in the scenario, reference can be made to the description of the corresponding part of the method embodiment below, which will not be described in detail here.

It should be understood that when there are multiple second electronic devices 220 and multiple first storage components 211 in the data reading and writing system, multiple second electronic devices 220 and multiple first storage components 211 may also be deployed with reference to the deployment relationship shown in FIG. 5 and FIG. 6. At this time, multiple second electronic devices 220 may be the deployed on the same or different types of systems, such as the x86 system, Windows system, iOS system, Android system, etc. The specific deployment structure will not be described in detail in the present disclosure.

To facilitate the description, the accompanying drawings only show parts related to the relevant disclosure. When there is no conflict, embodiments of the present disclosure and features of embodiments may be combined with each other.

In conjunction with the composition of the data reading and writing system described in the foregoing embodiments, a data reading and writing method and a control method will be described in detail below with examples, but the present disclosure is not limited to the examples provided below. In the embodiments of the present disclosure, flowcharts are used to illustrate the operations performed by a system. It is to be expressly understood, the operations before or after may or may not be implemented in order. Conversely, the operations may be performed in inverted order, or simultaneously. Besides, one or more other operations may be added to the flowcharts, or one or more operations may be omitted from the flowchart.

Figure 7:
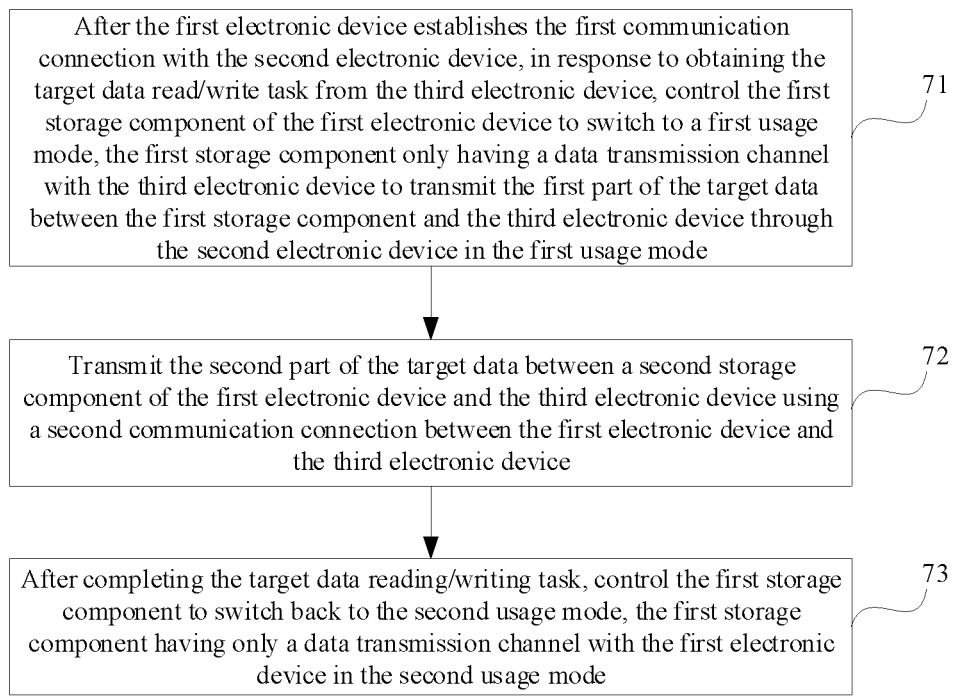
FIG. 7 is a flowchart of a data reading and writing method according to an embodiment of the present disclosure.

Refer to FIG. 7, which is a flowchart of a data reading and writing method according to an embodiment of the present disclosure. The method can be applied to the first electronic device in the above system, such as a NAS device. The method will be described in detail below.

71, after the first electronic device establishes the first communication connection with the second electronic device, in response to obtaining the target data read/write task from the third electronic device, controlling the first storage component of the first electronic device to switch to a first usage mode.

In conjunction with the above description of the technical solution of the present disclosure, when there is a need to perform a target data read/write task from a third electronic device (such as a smartphone, a laptop, a desktop computer, a server, etc., which can be determined based on the data transmission scenario), in order to improve task execution efficiency, in the present disclosure, the target data may be split into multiple partial target data, and the idle resources of at least one second electronic device may be used to establish a communication connection with the first electronic device to form multiple data transmission channels for the target data. In this way, each part of the target data can be transmitted to the storage component of the first electronic device through a data transmission channel. Correspondingly, by transmitting multiple parts of the target data simultaneously, the time spent on transmitting the target data can be shortened and the data reading and writing speed can be improved.

Based on this, in conjunction with the relevant description of the system embodiment shown in FIG. 2, after the first electronic device receives the target data read/write task sent by the third electronic device, in order to increase the target data transmission speed and make full use of the idle resources of the second electronic device (such as idle data transmission resources, etc.), the first electronic device can be triggered to establish a first communication connection (including but not limited to the first communication connection establishment method shown in FIG. 5 and FIG. 6) with at least one second electronic device. For the implementation process, reference can be made to the description of the corresponding embodiments, which will not be described in detail here.

The number of second electronic devices that establish a first communication connection with the first electronic device may be based on the data processing capabilities of the first electronic device and each second electronic device, or even the network quality of the network in which the second electronic devices and the first electronic device are located. In this way, the determination may be made after the first electronic device obtains the target data read/write task. In some embodiments, the number of second electronic device that establish a first communication connection with the first electronic device may also be pre-configured, and the device identification of each second electronic device may even be pre-configured. In this way, after the first electronic device receives the target data read/write task, the corresponding second electronic device can be triggered to establish a first communication connection with the first electronic device through broadcast or other network devices (e.g., the user may use a mobile phone to connect the NAS device to the computer as the second electronic device). The present disclosure does not limit the establishment and implementation method of the first communication connection and its connection type, which can be set based on actual needs.

Subsequently, the first electronic device may control the first storage component of the first electronic device to switch to the first usage mode in response to the obtained target data read/write task, such as the usage mode in the state of the switch shown in the foregoing system embodiment. In conjunction with the above analysis, in the first usage mode, the first storage component may disconnect the data transmission channel with the first electronic device such that the first storage component only has a data transmission channel with the second electronic device to transmit the first part of the target data between the first storage component and the third electronic device through the second electronic device. The first part of the target data may be a part of the target data required for the target data read/write task. The present disclosure does not limit the splitting method of the target data.

Take the target data writing task as an example. When the first storage component switches to the first usage mode, the second electronic device can connect to the third electronic device through a second communication interface and receive the first part of the target data sent by the third electronic device, then transmit the first part of the target data to the first storage component for storage through the data transmission channel formed with the first storage component. The data transmission process can be implemented based on the communication protocol followed by the communication interface used to build the data transmission channel. The present disclosure does not limit the implementation process of how the second electronic device controls the transmission of the first part of the target data to the first storage component.

72, transmitting the second part of the target data between a second storage component of the first electronic device and the third electronic device using a second communication connection between the first electronic device and the third electronic device.

In this embodiment, as an example, the target data from the third electronic device is split into two parts. Therefore, the second part of the target data may be the remaining part of the target data after removing the first part of the target data. It should be understood that when the target data with a relatively large amount data needs to be split into more parts of the target data, the multi-part target data may be sequentially recorded as the first part of the target data, the second part of the target data, the third part of the target data, etc. The multi-part target data can be combined to form the complete target data, which will not be described in detail in this embodiment.

Continue with the target data writing task as an example. In the process of the third electronic device transmitting the first part of the target data to the first storage component through the second electronic device, the third electronic device may also be connected through the second communication connection (e.g., a NAS network connection) with the first electronic device to send the second part of the target data to the first electronic device. The first electronic device may transmit the second part of the target data to a second storage component. In this way, each part of the to-be-written target data can be obtained corresponding to different storage components through different data transmission channels. This process can be performed synchronously or staggered based on specific rules. Compared with the transmission method of transmitting the complete target data through one data transmission channel, the time spent on data transmission is greatly shortened.

Similarly, in the target data reading task scenario, the second electronic device may read the first part of the target data from the first storage component through the data transmission channel formed with the first storage component, and then transmit the first part of the target data to the third electronic device. In the implementation process, the first electronic device may also read the second part of the target data from the second storage component and transmit the second part of the target data to the third electronic device. In this way, the third electronic device can obtain each part of the target data to be read through different data transmission channels at the same time or within a small interval, which greatly improves the efficiency of reading target data.

In some embodiments, in order to improve the security of data transmission, each part of the target data obtained may be processed using an encryption algorithm and then output through the corresponding data transmission channel. Under the target data writing task, privacy computing technology may also be used to fragment the target data to be written to obtain multiple fragmented target data, that is, the multi-part target data. In the subsequent target data reading task, the corresponding privacy computing algorithm may be used to decrypt and reorganize the multiple fragmented target data to obtain the complete target data, but the data encryption transmission implementation method is not limited to the method described above.

Consistent with the present disclosure, when the target data writing task from the third electronic device is obtained, the data transmission channel between the first storage component and the first electronic device can be disconnected and the data transmission channel between the first storage component and the second electronic device can be connected. In this way, the first part of the target data can be written to the first storage component via the second electronic device, and the second part of the target data can be written to the second storage component via the second communication connection. When the target data reading task from the third electronic device is obtained, the data transmission channel between the first storage component and the first electronic device can be disconnected and the data transmission channel between the first storage component and the second electronic device can be connected. In this way, the first part of the target data can be read from the first storage component through the second electronic device and then transmitted to the third electronic device, and the second part of the target data read from the second storage component can be transmitted to the third electronic device through the second communication connection.

The switching control between different usage modes of the first storage component in the first electronic device described above can be implemented in conjunction with the circuit structure described in the foregoing system embodiment. For example, when the switch in the control system is in the state indicated by the solid line in the accompanying drawings, the first storage component may be triggered to enter the first usage mode. On the contrary, when the switch in the control system is in the state indicated by the dotted line in the accompanying drawings may trigger the first storage component to enter a second usage mode. The switching control between different states of the switch can be implemented by a corresponding switching instruction generated by the first electronic device, or it can also be controlled by other devices. The present disclosure does not limit the switching control method of different usage modes of the first storage component.

73, after completing the target data reading/writing task, controlling the first storage component to switch back to the second usage mode, the first storage component having only a data transmission channel with the first electronic device in the second usage mode.

Based on the method described above, different parts of the target data can be transmitted to the corresponding device (e.g., the third device corresponding to the target data reading task, or the storage components corresponding to the target data writing task) through multiple data transmission channels. After determining that the corresponding target data reading/writing task is completed, the first storage component may be controlled to switch back to the second usage mode. In the second usage mode, the first storage component may disconnect the data transmission channel with the second electronic device such that the first storage component only has a data transmission channel with the first electronic device. At this time, both the first storage component and the second electronic device may be connected to the first electronic device.

In some embodiments, in the target data writing task scenario, after writing each part of the target data to different storage components based on the method described above, in order to achieve target data backup storage, data mirroring may be performed between the first storage component and the second storage component, such as the method shown in FIG. 4, FIG. 5, and FIG. 6. The first electronic device may write the first part of the target data stored in the first storage component to the second storage component and write the second part of the target data stored in the second storage component to the first storage component. In this way, the complete target data can be written in both the first storage component and the second storage component.

In some embodiments, in the target data reading task scenario, based on the method described above, different parts of the target data may be read from different storage components and transmitted to the third electronic device through the plurality of corresponding data transmission channels. The third electronic device may reorganize the plurality of parts of target data to obtain the complete target data. This process can be implemented based on the data attribute information carried by each part of the target data, or the data configuration information determined by the first electronic device for reading using the multi-part target data before reading the target data. the implementation process will not be described in detail in the present disclosure.

Consistent with the present disclosure, during the execution of the target data reading/writing task from the third electronic device, the first storage component of the first electronic device can be controlled to enter the first usage mode such that the first storage component only has a data transmission channel with the second electronic device, and a new data transmission channel can be formed between the third electronic device and the first storage component through the second electronic device. Since there is also a data transmission channel between the second storage component of the first electronic device and the third electronic device at this time, the system can simultaneously realize independent transmission of the first part of the target data and the second part of the target data that constitute the target data through these two data transmission channels. In this way, the transmission time of all target data is shortened and the efficiency of reading and writing target data is improved.

It should be noted that in a scenario where the first electronic device establishes different first communication connections with multiple second electronic devices respectively, multiple first storage components of the first electronic device may be controlled to enter the first usage mode such that multiple data transmission channels can be formed between the third electronic device and the corresponding first storage components through different second electronic devices such that the target data can be transmitted more quickly, which further improves the efficiency of reading and writing target data. The implementation process is similar to the data reading and writing task described, and details will not be provided here again.

Figure 8:
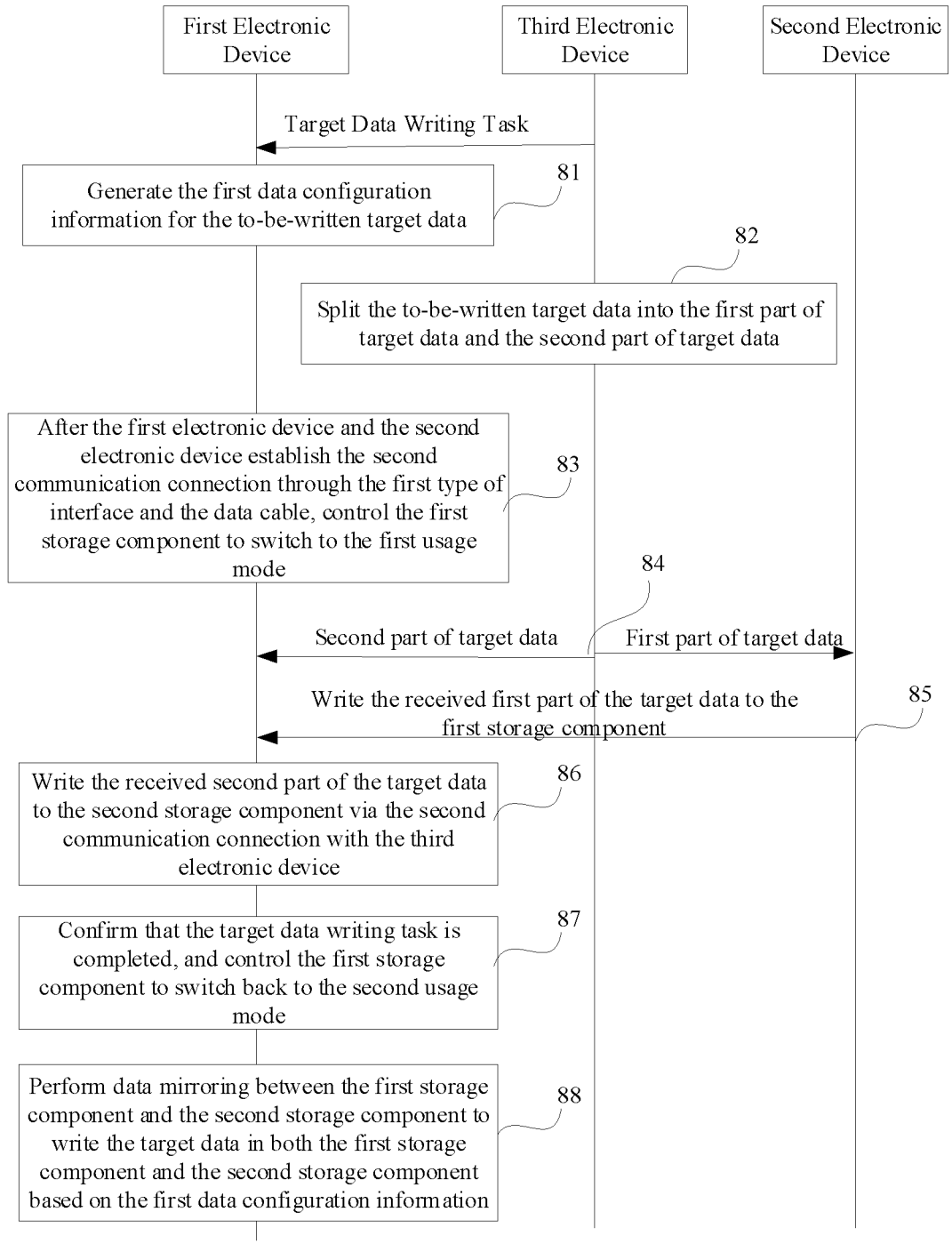
FIG. 8 is a schematic diagram of the signal flow of the data reading and writing method according to an embodiment of the present disclosure.

FIG. 8 is a schematic diagram of the signal flow of the data reading and writing method according to an embodiment of the present disclosure. This embodiment describes the target data writing task scenario from the third electronic device. The method will be described in detail below.

81, obtaining, by the first electronic device, the target data writing task from the third electronic device and generating first data configuration information for the to-be-written target data.

In some embodiments, in order to quickly write the target data from the third electronic device to the first storage component and the second storage component, when building the target data transmission system, in the present disclosure, the number of data transmission channels the system uses at the application level may be defined in advance to achieve the transmission of target data. That is, the number of communication interfaces that need to be configured to connect to the third electronic device to realize the target data transmission with the third electronic device.

Therefore, in the present disclosure, a data transmission configuration interface can be entered through the first electronic device to prompt the user to configure a plurality of communication interfaces for transmitting the target data, such as the first communication interface and the second communication interface or multiple data transmission interfaces for the first storage component described in the foregoing system embodiment. The user may input the number of communication interfaces used to transmit the target data based on the second electronic device in the data transmission scenarios and its network configuration information, hardware configuration information, etc., and can even select the type of each communication interface. In some embodiments, the first electronic device may also automatically obtain the number of communication interfaces based on its own and the second electronic device's respective network configuration information, hardware configuration information and other data that can characterize the network transmission and data reading and writing capabilities of the electronic device. That is, the number of splits of the to-be-transmitted target data. The implementation process will not be described in the present disclosure.

Based on the above analysis, the first data configuration information described above may be used to indicate splitting the target data into multiple parts, and the relationship between the multiple parts of the target data such that the device that subsequently receives the multiple parts of the target data can reconstruct the multiple parts of the target data based on the first data configuration information to obtain the complete target data. Therefore, the first data configuration information may include data splitting rules, corresponding data reconstruction rules, etc. As described above, the first data configuration information can be generated based on the respective network configuration information and hardware configuration information of the first electronic device and the second electronic device. The present disclosure does not limit the content and expression of the network configuration information and hardware configuration information, which can be set based on actual needs.

82, feeding, by the first electronic device, the first data configuration information back to the third electronic device to cause the third electronic device to split the to-be-written target data into the first part of the target data and the second part of the target data.

In the embodiments of the present disclosure, the splitting of the to-be-written target data may be performed by the third electronic device. Therefore, the first electronic device may send the generated first data configuration information to the third electronic device, and the third electronic device may split the to-be-written target data into the first part of the target data and the second part of the target data based on the first data configuration information. It should be understood that if the first data configuration information indicates that the to-be-written target data is split into more parts, the to-be-written target data may be split into a corresponding number of multi-part target data accordingly. The implementation process is similar and will not be described in detail in the present disclosure.

In some embodiments, the third electronic device may send the to-be-written target data to the first electronic device. After the first electronic device generates the first data configuration information, the to-be-written target data may be directly split into multiple parts of target data based on the first data configuration information, and then the first part of the target data may be fed back to the third electronic device such that the third electronic device can send the first part of the target data to the second electronic device. The present disclosure does not limit the execution subject of the splitting operation of the to-be-written target data, which can be set based on actual needs.

83, after the first electronic device and the second electronic device establishes a first communication connection through the first type of interface and the data cable, in response to the target data writing task, controlling, by the first electronic device, the first storage component to switch to the first usage mode.

Refer to the scenario diagrams shown in FIG. 5 and FIG. 6, the first type of interface may include, but is not limited to one or more combinations of eSATA interface, PCIE interface, pins, etc. which can be set based on actual communication needs. It should be noted that the implementation method for establishing the first communication connection between the first electronic device and the second electronic device may include, but is not limited to the process at 83.

In some embodiments, before transmitting the to-be-written target data, in response to the target data writing task, the first electronic device may disconnect the data transmission channel between the first storage component and the first electronic device and connect the data transmission channel with the second electronic device to cause the first storage component to enter the first usage mode. The present disclosure does not limit the circuit control implementation of the first usage mode. The control method of different states of the switch described above may be used, but the present disclosure is not limited thereto.

84, sending, by the third electronic device, the first part of the target data to the second electronic device, and the second part of the target data to the first electronic device.

85, writing, by the second electronic device, the received first part of the target data to the first storage component.

With reference to the system structure diagram shown in the accompanying drawings, when the first storage component is in the first usage mode, the third electronic device may form a data transmission channel with the first storage component through the second electronic device, and transmit the first part of the target data to the first storage component for storage.

86, writing, by the first electronic device, the received second part of the target data to the second storage component through the second communication connection with the third electronic device.

During the transmission process of the first part of the target data described above, in order to improve the transmission efficiency of the to-be-written target data, the second part of the target data may be simultaneously transmitted to the second storage component through the data transmission channel between the third electronic device and the first electronic device. It should be noted that the present disclosure does not limit the transmission of the first part of the target data and the second part of the target data through different data transmission channels. The first part of the target data and the second part of the target data may be transmitted simultaneously, or transmitted at relatively short intervals without waiting for a part of the to-be-transmitted target data before transmitting another part of the target data, which shortens the transmission time of the to-be-written target data and improves data writing efficiency.

For example, for target data that contains multiple blocks (i.e., the smallest read/write unit in the system) such as target data that contains block1, block2, block3, and block4 to be read or written, based on the pre-configured first data configuration information, block1 and block3 may be split into the first part of the target data, and block2 and block4 may be split into the second part of the target data. Based on the method described above, in the target data writing task scenario, block1 and block3 may be written into the first storage component through the second communication connection, and at the same time, block2 and block4 may be written into the second storage component through the first electronic device. Both data transmission paths can have an exclusive data transmission channel, and the two parts of the target data can be transmitted at the same time. This multi-system collaborative transmission method makes full use of the computing power of multiple systems and improves the data transmission speed.

87, determining, by the first electronic device, that the target data writing task is completed, and controls the first storage component to switch back to the second usage mode.

88, performing, by the first electronic device, data mirroring between the first storage component and the second storage component based on the first data configuration information to write the target data in both the first storage component and the second storage component.

To not affect the data reading and writing method described in the present disclosure, and realize the subsequent data reading and writing operations on other target data, after determining that the target data writing task is completed, for example, the first electronic device has completed the second part of the target data writing task, and feedback information forward by the third electronic device that the second electronic device has completed the first part of the target data writing task is received, it can be determined that the multi-channel data transmission channel has written multiple parts of the target data into the corresponding storage components, and the first storage component can be controlled to return to the second usage mode. In this way, the data transmission channel between the first storage component and the second electronic device can be disconnected and the data transmission channel between the first storage component and the first electronic device can be connected.

In some embodiments, after determining that the target data writing task is completed, in order to achieve backup storage of the target data, the first electronic device may perform data mirroring between the first storage component and the second storage component based on the first data configuration information carried by the target data writing task such that the target data can be written in both the first storage component and the second storage component. Continue with the writing task scenario of multiple blocks of target data described above as an example. Based on the first data configuration information, the first electronic device may determine that the first storage component is storing block1 and block3 data, and the second storage component is storing block2 and block4 data. In this way, block1 and block3 may be read from the first storage component and then written into the second storage component, and block2 and block4 may be read from the second storage component and then written into the first storage component. At this time, the original storage data of these two storage components will not be affected, such that both storage components can store block1, block2, block3, and block4 data for subsequent access.

In some embodiments, the first storage component and the second storage component may form a RAID array. The implementation method of lagging RAID reconstruction in the present disclosure can ensure successful and timely backup of data without affecting the data transmission speed. The present disclosure does not limit the implementation of target data reconstruction.

Figure 9:
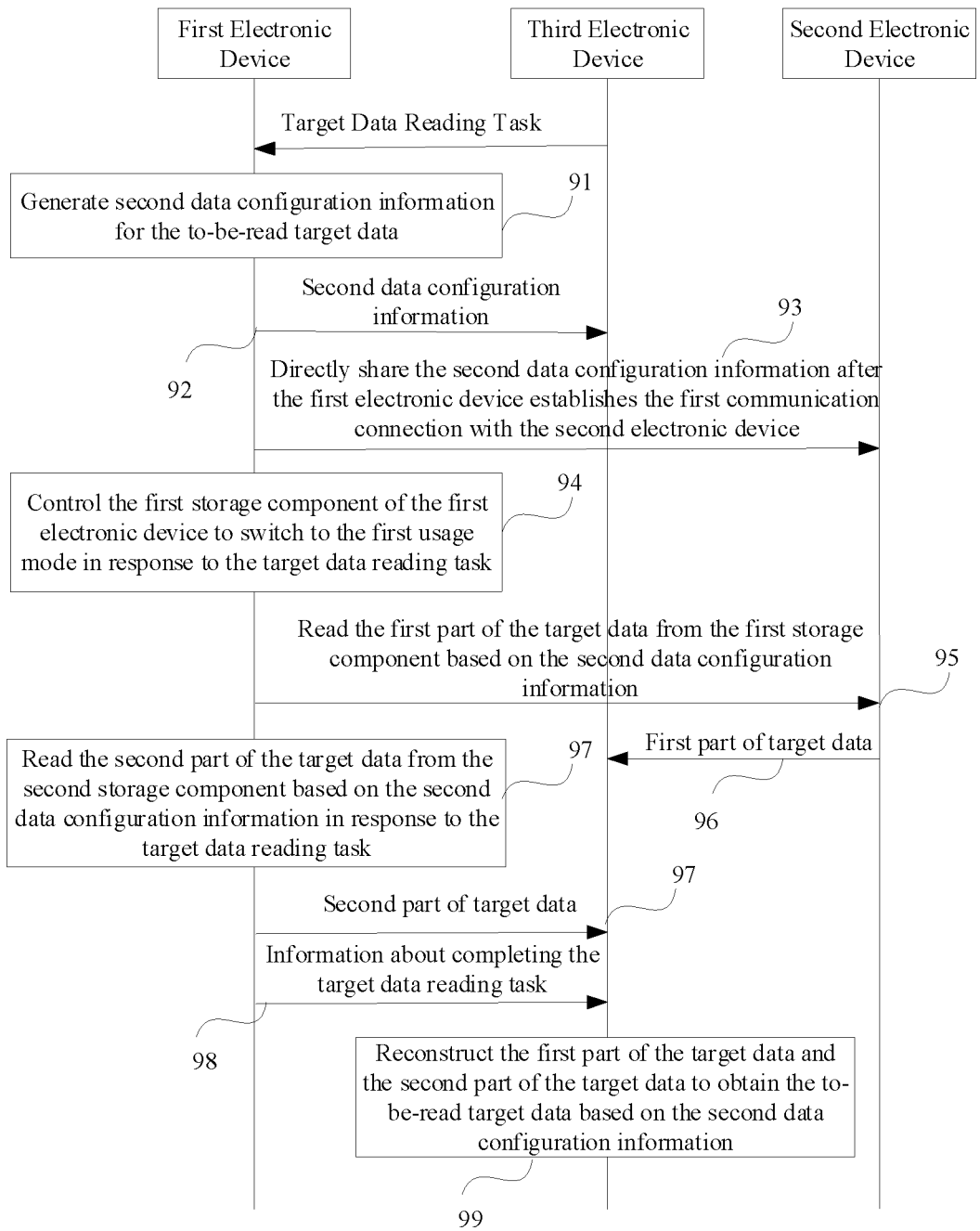
FIG. 9 is a schematic diagram of the signal flow of the data reading and writing method according to an embodiment of the present disclosure.

FIG. 9 is a schematic diagram of the signal flow of the data reading and writing method according to an embodiment of the present disclosure. This embodiment describes the target data reading task scenario from the third electronic device. The method will be described in detail below.

91, obtaining, by the first electronic device, the target data reading task from the third electronic device and generating second data configuration information for the to-be-read target data.

92, feeding, by the first electronic device, the second data configuration information to the third electronic device.

The generation process of the second data configuration information is similar to the generation process of the first data configuration information described above, which will not be repeated here.

93, directly sharing the second data configuration information with the second electronic device after the first electronic device establishes the first communication connection with the second electronic device.

For the process of establishing the first communication connection between the first electronic device and the second electronic device, reference can be made to the process described in the corresponding parts of the above embodiments, which will not be repeated here. In some embodiments, target network devices such as base stations, network access equipment, etc. may also be borrowed. In this way, both the first electronic device and the second electronic device can connect to the target network device and determine to establish the first communication connection described above.

In some embodiments, the third electronic device may also be used to output a networking instruction to trigger the first electronic device and the second electronic device to establish a first communication connection. Therefore, the third electronic device may send the networking instruction to the first electronic device and the second electronic device to establish the first communication connection between the first electronic device and the second electronic device. For example, the user may log into the mobile phone's operating interface to associate the NAS device with computer A (i.e., the second electronic device) or computer B (i.e., the third electronic device) to form a multi-system architecture, such as NAS+x86 dual-system architecture, and may also obtain more system associations.

In the schematic diagram of the data reading and writing scenario shown in FIG. 5, the first electronic device and the second electronic device are independent devices and are deployed in the same chassis. After the first electronic device generates the first data configuration information, the first data configuration information can be shared with the second electronic device through the third electronic device to realize the communication connection between the first electronic device and the second electronic device. In this way, the corresponding second electronic device can read the first part of the target data from the first storage component, and the first electronic device can read the second part of the target data from the second storage component. The implementation process will not be described in the present disclosure.

94, in response to the target data reading task, controlling, by the first electronic device, the first storage component of the first electronic device to switch to the first usage mode.

95, reading, by the second electronic device, the first part of the target data from the first storage component based on the second data configuration information.

96, transmitting, by the second electronic device, the first part of the target data to the third electronic device.

97, in response to the target data reading task, reading, by the first electronic device, the second part of the target data from the second storage component based on the second data configuration information.

98, transmitting, by the first electronic device, the second part of the target data to the third electronic device.

99, receiving, by the third electronic device, the information of completing the target data reading task fed back by the first electronic device, and reconstructing the first part of the target data and the second part of the target data based on the second data configuration information to obtain the to-be-read target data.

For the implementation process of processes 94-99, reference can be made to the description of the corresponding parts of the foregoing embodiments, which will not be repeated here.

Refer to the schematic diagram of the scenario shown in FIG. 6. In some embodiments, when the first electronic device and the second electronic device are deployed in the same chassis, after obtaining the target data reading task from the third electronic device, the first electronic device may generate the first data configuration information for the to-be-read target data. For detail, reference can be made to the first data configuration information generation process described above. Subsequently, the second data configuration information can be directly shared with the second electronic device. That is, the second data configuration information can be sent to or shared with the second electronic device using the communication method between the first electronic device and the second electronic device of the same electronic device such that the third electronic device can read the second data configuration information. In this way, the second electronic device can transmit the first part of the target data read from the first storage component to the third electronic device. For the implementation process, reference can be made to the description of the corresponding embodiments, which will not be described in detail here.

Figure 10:
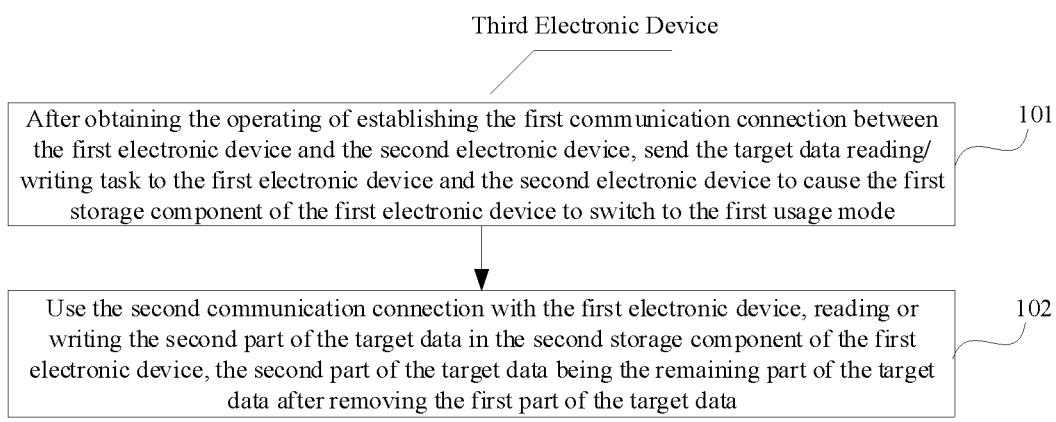
FIG. 10 is a flowchart of a control method according to an embodiment of the present disclosure.

FIG. 10 is a flowchart of a control method according to an embodiment of the present disclosure. The method can be applied to the third electronic device in the above data reading and writing system. The system may be a mobile phone, a computer, a server, etc. The method will be described in detail below.

101, after obtaining the operating of establishing the first communication connection between the first electronic device and the second electronic device, sending the target data reading/writing task to the first electronic device and the second electronic device to cause the first storage component of the first electronic device to switch to the first usage mode.

In some embodiments, in the first usage mode, the first storage component may only have a data transmission channel with the second electronic device to transmit the first part of the target data between the first storage component and the third electronic device through the second electronic device, the first part of the target data being the part of the target data required by the target data reading/writing task. For the circuit connection relationship in the first usage mode, reference can be made to the description of the corresponding parts of the foregoing embodiments.

In some embodiments, when the third electronic device obtains the target data reading/writing task, in order to improve the task execution efficiency, the establishment of the first communication connection between the first electronic device and the second electronic device may be triggered based on the description in the corresponding part of the present disclosure. At this time, the third electronic device can be connected to the first electronic device and the second electronic device respectively to split the target data into the first part of the target data and the second part of the target data, and send them to the first electronic device and the second electronic device respectively. The implementation process will not be described in the present disclosure.

102, using the second communication connection with the first electronic device, reading or writing the second part of the target data in the second storage component of the first electronic device, the second part of the target data being the remaining part of the target data after removing the first part of the target data.

When the data reading and writing system forms multiple data transmission channels, the third electronic device may transmit multiple parts of the target data to the corresponding storage components in the first electronic device through different data transmission channels. For the implementation process, reference can be made to the corresponding part of the foregoing embodiments.

Figure 11:
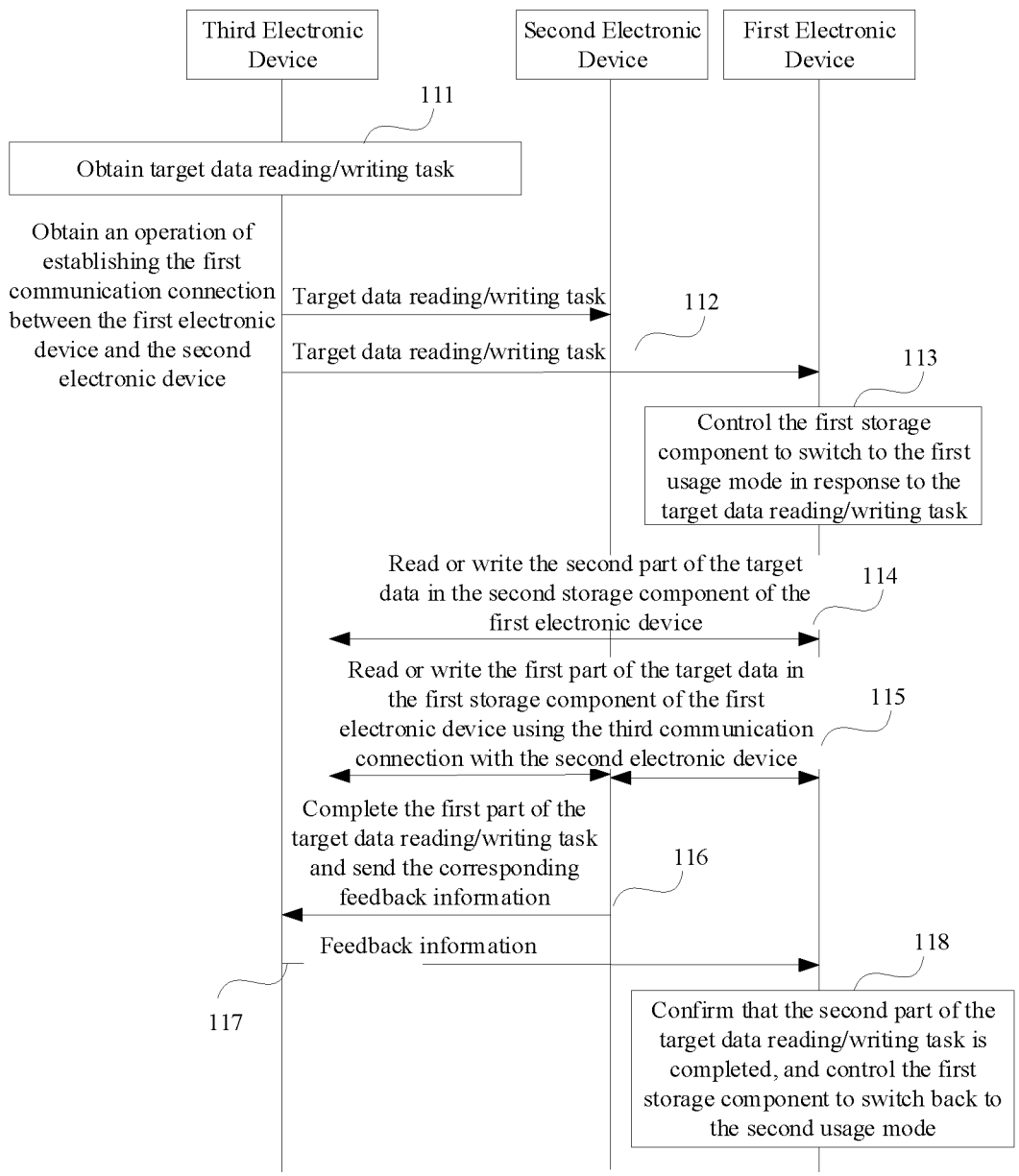
FIG. 11 is a flowchart of the control method according to an embodiment of the present disclosure.

FIG. 11 is a flowchart of the control method according to an embodiment of the present disclosure. The method can still be applied to the third electronic device in the above data reading and writing system. The method will be described in detail below.

111, obtaining, by the third electronic device, the target data reading/writing task.

112, obtaining, by the third electronic device, the operation of establishing the first communication connection between the first electronic device and the second electronic device, and sending the target data reading/writing task to the first electronic device and the second electronic device.

In some embodiments, the third electronic device may split the target data into multiple parts of target data to obtain the corresponding target data reading/writing tasks such as the first part of the target data reading/writing task and the second part of the target data reading/writing task. The first part of the target data reading/writing task may be sent to the second electronic device, and the second part of the target data reading/writing task may be sent to the first electronic device. In this way, the electronic device can read or write the corresponding part of the target data. The implementation process will not be described in the present disclosure.

113, in response to the target data reading/writing task, controlling, by the first electronic device, the first storage component to switch to the first usage mode.

114, reading or writing, by the third electronic device, the second part of the target data in the second storage component of the first electronic device using the second communication connection with the first electronic device.

115, reading or writing, by the third electronic device, the first part of the target data in the first storage component of the first electronic device using a third communication connection with the second electronic device.

In accordance with, but not limited to, the methods described above, the first electronic device or the third electronic device may split the target data into multiple parts of target data, such as the first part of the target data and the second part of the target data, and control the first storage component to enter the first usage mode. The third electronic device may respectively realize the transmission of the first part of the target data and the second part of the target data through the respective data transmission channels of the first electronic device and the second electronic device. For example, under the target data writing task, the first part of the target data may be transmitted to the first storage component, and the second part of the target data may be transmitted to the second storage component; under the target data reading task, the first part of the target data in the first storage component may be read through the second electronic device, and the second part of the target data in the second storage component may be read through the first electronic device, however, the target data reading and writing process in the present disclosure is not limited thereto.

116, completing, by the second electronic device, the first part of the target data reading/writing task, and sending the corresponding feedback information to the third electronic device.

117, forwarding, by the third electronic device, the feedback information that the second electronic device completes the corresponding target data reading/writing task to the first electronic device.

118, determining, by the first electronic device, that the second part of the target data reading/writing task is completed, and controlling the first storage component to switch back to the second usage mode.

Refer to the transmission process of different data transmission channels of multiple parts of the target data described above, after the second electronic device writes the first part of the target data to be written into the first storage component, feedback information representing completion of the first part of the target data writing task may be generated and sent to the third electronic device. The third electronic device may forward the feedback information to the first electronic device to notify the first electronic device that the writing operation of the first part of the target data is completed.

In this way, when the first electronic device writes the second part of the target data to be written into the second storage component, that is, after it is determined that different parts of the target data to be written are written into the corresponding first storage component and the second storage component, that is, it is determined that the first part of the target data writing task and the second part of the target data writing task are completed, the first storage component may be controlled to switch back to the second usage mode such that the first storage component only has a data transmission channel with the first electronic device.

For example, as shown in FIG. 5, in a scenario where the first electronic device and the second electronic device are independent devices and are deployed in different chassis, assume that the first electronic device is a NAS device and the second electronic device is computer A. After computer A completes the first part of the target data transmission, it cannot directly notify the NAS device that the task has been completed. At this time, the feedback information indicating that the task has been completed may be forwarded through the third electronic device (such as computer B), or the feedback information may be forwarded through a network device (such as a mobile phone) connected to both computer A and the NAS device. For the implementation method of forwarding the feedback information, reference can be made to the implementation method of establishing the first communication connection between the first electronic device and the data transmission channel. The present disclosure does not limit the implementation method of forwarding the feedback information.

In another example, as shown in FIG. 6, in a scenario where the first electronic device and the second electronic device are deployed in the same chassis, the first electronic device (such as a NAS device) may be configured to determine the completion of the target data reading/writing task, and send the generated information indicating that the target data reading/writing task is completed to the third electronic device for the third electronic device to perform subsequent tasks. Alternatively, after reading the first part of the target data from the first storage component and reading the second part of the target data from the second storage component, data reconstruction may be performed on the first part of the target data and the second part of the target data to obtain the target data. Of course, the reconstruction process of the multiple parts of the target data may also be performed by the first electronic device. For example, the NAS system may reconstruct the multiple parts of the target data and then send the complete target data to the third electronic device.

It should be noted that the present disclosure does not limit the content and output form of the above information and feedback information that can indicate the completion of the target data reading/writing task, which can be set based on actual needs.

In conjunction with the relevant description of the target data splitting implementation method in the foregoing embodiments, for the target data writing task, the first data configuration information may be generated by the third electronic device, and the target data splitting process may be implemented accordingly. For example, after obtaining the target data writing task, first data configuration information for the to-be-written target data may be generated, and based on the first data configuration information, the to-be-written target data may be split into a first part of target data and a second part of target data. for the implementation process, reference can be made to the corresponding part of the foregoing embodiments, which will not be repeated here.

In some embodiments, for the target data reading task, the first data configuration information may be generated by the first electronic device such as a NAS device to achieve split reading of the target data. In this way, after sending the target data reading task to the first electronic device, the third electronic device may receive the second data configuration information generated and fed back by the first electronic device for the to-be-read target data, and share the second data configuration information with the second electronic device. The first electronic device may read the second part of the target data from the second storage component, and the second electronic device may read the first part of the target data from the first storage component. In this way, after the third electronic device receives the first part of the target data read by the second electronic device from the first storage component, and the second part of the target data read by the first electronic device from the second storage component, the first part of the target data and the second part of the target data can be reconstructed based on the second data configuration information to obtain the to-be-read target data.

It should be noted that the target data may be split into two parts, three parts, or even more parts for reading and writing operations. The above control method performed by the third electronic device is mainly described by the implementation process of splitting the target data into two parts for reading or writing operations. The reading or writing operations for target data that is split into multiple parts is similar, which will not be repeated here.

Figure 12:
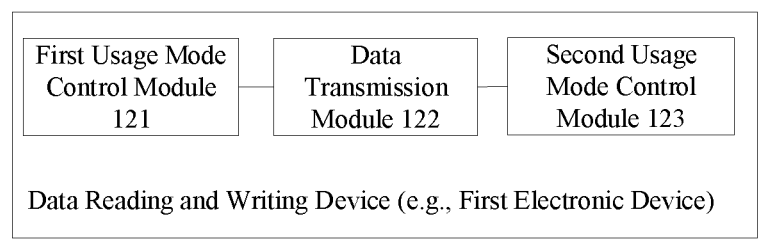
FIG. 12 is a schematic structural diagram of a data reading and writing device according to an embodiment of the present disclosure.

FIG. 12 is a schematic structural diagram of a data reading and writing device according to an embodiment of the present disclosure. The device may be adapted to a first electronic device. As shown in FIG. 12, the device includes a first usage mode control module 121, a data transmission module 122, and a second usage mode control module 123.

In some embodiments, the first usage mode control module 121 may be configured to control the first storage component of the first electronic device to switch to the first usage mode in response to obtaining a target data reading/writing task from the third electronic device after the first electronic device establishes a first communication connection with the second electronic device.

In some embodiments, in the first usage mode, the first storage component may only have a data transmission channel with the second electronic device to connect the first storage component and the third electronic device through the second electronic device to transmit the first part of the target data between the first storage component and the third electronic device through the second electronic device, the first part of the target data being a part of the target data required for the target data reading/writing task.

In some embodiments, the data transmission module 122 may be configured to use the second communication connection between the first electronic device and the third electronic device to transmit the second part of the target data between the second storage component of the first electronic device and the third electronic device. The second part of the target data being the remaining part of the target data after removing the first part of the target data.

In some embodiments, the second usage mode control module 123 may be configured to control the first storage component to switch back to the second usage mode after completing the target data reading/writing task, in the second usage mode, the first storage component only having a data transmission channel with the first electronic device.

In some embodiments, the data reading and writing device may also include a data mirroring processing module. The data mirroring processing module may be configured to perform data mirroring between the first storage component and the second storage component based on the data configuration information carried by the target data writing task after completing the target data writing task to write the target data into both the first storage component and the second storage component.

In some embodiments, the device may include a first communication connection establishing module. The first communication connection establishing module may be configured to establish a first communication connection between the first electronic device and the second electronic device.

In some embodiments, the first communication connection establishing module may include at least one of a first establishing unit, a second establishing unit, and a third establishing unit. The first establishing unit may be configured to establish the first communication connection between the first electronic device and the second electronic device through the first type of interface and the data cable. The second establishing unit may be configured to determine to establish the first communication connection after both the first electronic device and the second electronic device are connected to the target network device. The third establishing unit may be configured to determine to establish the first communication connection after the first electronic device and the second electronic device obtain the network instruction from the third electronic device.

Based on the above analysis, the data reading and writing device may also include a first generation module, a first data configuration information feedback module, a second generation module, a first sharing module, a third generation module, and a second sharing module.

In some embodiments, the first generation module may be configured to generate the first data configuration information for the to-be-written target data after obtaining the target data writing task from the third electronic device.

In some embodiments, the first data configuration information feedback module may be configured to feed the first data configuration information back to the third electronic device to cause the third electronic device to split the to-be-written target data into a first part of target data and a second part of target data.

In some embodiments, the second generation module may be configured to generate the second data configuration information for the to-be-read target data after obtaining the target data reading task from the third electronic device.

In some embodiments, the first sharing module may be configured to directly share the second data configuration information with the second electronic device to cause the second electronic device to transmit the first part of the target data read from the first storage component to the third electronic device.

In some embodiments, the third generation module may be configured to generate the second data configuration information for the to-be-read target data after obtaining the target data reading task from the third electronic device.

In some embodiments, the second sharing module may be configured to share the second data configuration information with the second electronic device through the third electronic device to cause the first part of the target data read by the second electronic device from the first storage component to be transmitted to the third electronic device.

In the implementation process of the data reading and writing device described in the foregoing embodiments, when the target data writing task is obtained from the third electronic device, the data transmission channel between the first storage component and the first electronic device may be disconnected, and the data transmission channel between the first storage component and the second electronic device may be connected. In this way, the first part of the target data can be written into the first storage component through the second electronic device and the second part of the target data can be written into the second storage component through the second communication connection.

In some embodiments, when the target data reading task is obtained from the third electronic device, the data transmission channel between the first storage component and the first electronic device may be disconnected, and the data transmission channel between the first storage component and the second electronic device may be connected. In this way, the first part of the target data can be read from the first storage component through the second electronic device and transmitted to the third electronic device, and the second part of the target data read from the second storage component can be transmitted to the third electronic device through the second communication connection. For the specific implementation processes of these two situations, reference can be made to the descriptions of the corresponding parts of the foregoing embodiments, which will not be repeated here.

Figure 13:
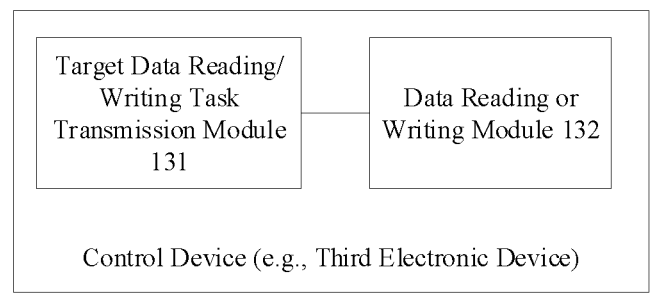
FIG. 13 is a schematic structural diagram of a control device according to an embodiment of the present disclosure.

FIG. 13 is a schematic structural diagram of a control device according to an embodiment of the present disclosure. The control device can be adapted to a third electronic device. As shown in FIG. 13, the control device includes a target data reading/writing task transmission module 131 and a data reading or writing module 132.

In some embodiments, the target data reading/writing task transmission module 131 may be configured to transmit the obtained target data reading/writing task to the first electronic device and the second electronic device to cause the first storage component of the first electronic device to switch to the first usage mode in response to obtaining the operation of establishing the first communication connection between the electronic device and the second electronic device.

In some embodiments, in the first usage mode, the first storage component may only have a data transmission channel with the second electronic device to connect the first storage component and the third electronic device through the second electronic device to transmit the first part of the target data between the first storage component and the third electronic device through the second electronic device, the first part of the target data being a part of the target data required for the target data reading/writing task.

In some embodiments, the data reading or writing module 132 may be configured to read or write the second part of the target data in the second storage component of the of the first electronic device using the second communication connection with the first electronic device, the second part of the target data being the remaining part of the target data after removing the first part of the target data.

In some embodiments, the control device may also include at least one of an information receiving module, a feedback information forwarding module, or a data reconstruction module.

In some embodiments, the information receiving module may be configured to receive information fed back by the first electronic device that the target data reading/writing task is completed.

In some embodiments, the feedback information forwarding module may be configured to forward the feedback information that the second electronic device has completed the corresponding target data reading/writing task to the first electronic device to cause the first electronic device to control the first storage component to switch back to the second usage mode. In some embodiments, in the second usage mode, the first storage component may only have a data transmission channel with the first electronic device.

In some embodiments, the data reconstruction module may be configured to reconstruct the first part of the target data and the second part of the target data to obtain the target data after obtaining the first part of the target data from the first storage component and the second part of the target data from the second storage component.

In some embodiments, the control device may also include a first data configuration information generation module, a data splitting module, a second data configuration information receiving module, a second data configuration information sharing module, and a target data receiving module.

In some embodiments, the first data configuration information generation module may be configured to generate the first data configuration information for the to-be-written target data after obtaining the target data writing task.

In some embodiments, the data splitting module may be configured to split the to-be-written target data into the first part of the target data and the second part of the target data based on the first data configuration information.

In some embodiments, the second data configuration information receiving module may be configured to receive he second data configuration information generated and fed back by the first electronic device for the to-be-written target data after sending the target data reading task to the first electronic device.

In some embodiments, the second data configuration information sharing module may be configured to share the second data configuration information to the second electronic device.

In some embodiments, the target data receiving module may be configured to receive the first part of the target data read by the second electronic device from the first storage component and receive the second part of the target data read by the first electronic device from the second storage component to trigger a data reconstruction module to perform data reconstruction on the first part of the target data and the second part of the target data to obtain the to-be-read target data.

The circuits, units, etc. in device embodiments may be stored in the memory as program modules. The processor may be configured to execute the above program modules stored in the memory to realize corresponding functions. For the functions implemented by the program modules and a combination thereof and the achieved technical effects, reference may be made to the descriptions of method embodiments, which are not described in detail in embodiments of the present disclosure.

The present disclosure further provides a computer-readable storage medium, which may store a computer program that, when the computer program is called and loaded by the processor of the first electronic device or the third electronic device, causes the processor to implement the processes of the target data reading and writing method or the control method described above.

In embodiments of the present disclosure, unless the context clearly indicates otherwise, the words "a," "an," "one type," and/or "the" do not only refer to the singular, and may also include the plural. Generally speaking, the terms "comprising" and "including" only imply the processes and elements that are clearly identified. These processes and elements do not constitute an exclusive list. The method or device may also include other processes or elements. An element defined by the phrase "including a . . . " does not preclude the existence of an additional identical element in the process, method, article, or apparatus that includes the element.

In the description of embodiments of the present disclosure, unless otherwise specified, "/" means or, for example, AB may mean A or B. "and/or" in the specification is only used to represent an association relationship of associated objects, which may represent three types of relationships, for example, A alone, A and B, and B alone. In addition, in the description of embodiments of the present disclosure, "a plurality" may refer to two or more than two.

The terms such as "first," "second," etc., are only for description, used to differentiate an operation, a unit, or a module from another operation, another unit, or another module, and do not necessarily require or imply any such actual relationship or order between these units, operations, or modules. Moreover, these terms cannot be understood as indicating or implying relative importance or indicating the number of technical features indicated. Thus, the features defined with "first" and "second" may expressly or implicitly include one or more of these features.

In addition, the various embodiments in the specification are described in a progressive or parallel manner. Each embodiment focuses on the differences from other embodiments. The same and similar parts between the various embodiments may be referred to each other. Since the devices and the computer apparatus of embodiments in the present disclosure correspond to the methods of embodiments in the present disclosure, for the relevant parts, reference may be made to the descriptions of the methods.

The above description of embodiments of the present disclosure may enable those skilled in the art to make or use the present disclosure. Various modifications to embodiments of the present disclosure will be apparent to those skilled in the art. The generic principles defined herein may be implemented in other embodiments without departing from the spirit or scope of the present disclosure. Therefore, the present disclosure is not limited to the embodiments in the specification but conforms to the widest scope consistent with the principles and novel features disclosed here.

What is claimed is:

1. A data reading and writing method comprising:
    after a first electronic device establishing a first communication connection with a second electronic device, controlling a first storage component of the first electronic device to switch to a first usage mode in response to obtaining a target data reading/writing task from a third electronic device, the first storage component only having a data transmission channel with the second electronic device in the first usage mode to cause the second electronic device to transmit a first part of target data between the first storage component and the third electronic device, the first part of the target data being a part of the target data required by the target data reading/writing task;
    transmitting a second part of the target data between a second storage component of the first electronic device and the third electronic device using a second communication connection between the first electronic device and the third electronic device, the second part of the target data being a remaining part of the target data after removing the first part of the target data; and
    after completing the target data reading/writing task, controlling the first storage component to switch back to a second usage mode, the first storage component only having the data transmission channel with the first electronic device in the second usage mode.

2. The method of claim 1, after completing the target data writing task, further comprising:
    performing data mirroring between the first storage component and the second storage component to write the target data in both the first storage component and the second storage component based on data configuration information carried by the target data writing task.

3. The method of claim 1, wherein the first electronic device establishing the first communication connection with the second electronic device includes at least one of:
    the first electronic device and the second electronic device establishing the first communication connection through a first type of interface and a data cable;
    determining that the first communication connection is established after both the first electronic device and the second electronic device are connected to a target network device; or
    determining that the first communication connection is established after the first electronic device and the second electronic device obtain a networking instruction from the third electronic device.

4. The method of claim 1 further comprising:
after obtaining the target data writing task from the third electronic device, generating first data configuration information for the to-be-written target data and feeding back the first data configuration information to the third electronic device to cause the third electronic device to split the to-be-written target data into the first part of the target data and the second part of the target data.

5. The method of claim 1 further comprising:
after obtaining the target data reading task from the third electronic device, generating second data configuration information for the to-be-read target data and directly sharing the second data configuration information with the second electronic device to cause the second electronic device to transmit the first part of the target data from the first storage component to the third electronic device.

6. The method of claim 1 further comprising:
after obtaining the target data reading task from the third electronic device, generating the second data configuration information for the to-be-read target data and sharing the second data configuration information with the second electronic device through the third electronic device to cause the third electronic device to transmit the first part of the target data read from the first storage component to the third electronic device.

7. The method of claim 1, wherein:
disconnecting the data transmission channel between the first storage component and the first electronic device and connecting the data transmission channel between the first storage component and the second electronic device to write the first part of the target data to the first storage component through the second electronic device and write the second part of the target data to be second storage component through the second communication connection when the target data writing task is obtained from the third electronic device.

8. The method of claim 1, wherein:
disconnecting the data transmission channel between the first storage component and the first electronic device and connecting the data transmission channel between the first storage component and the second electronic device to transmit the first part of the target data read from the first storage component through the data transmission channel to the third electronic device, and transmit the second part of the target data read from the second storage component to the third electronic device through the second communication connection when the target data reading task is obtained from the third electronic device.

9. A control method applied to a third electronic device, comprising:
after obtaining an operation of establishing a first communication connection between a first electronic device and a second electronic device, sending an obtained target data reading/writing task to the first electronic device and the second electronic device to cause a first storage component of the first electronic device to switch to a first usage mode, the first storage component only having a data transmission channel with the second electronic device in the first usage mode to cause the second electronic device to transmit a first part of target data between the first storage component and the third electronic device, a first part of the target data being a part of the target data required by the target data reading/writing task; and reading or writing a second part of the target data in a second storage component of the first electronic device using a second communication connection with the second storage component, the second part of the target data being a remaining part of the target data after removing the first part of the target data.

10. The method of claim 9 further comprising:
receiving information from the first electronic device on completion of the target data reading/writing task.

11. The method of claim 9 further comprising:
forwarding feedback information that the third electronic device has completed a corresponding reading/writing task to the first electronic device to cause the first electronic device to control the first storage component to switch back to a second usage mode, the first storage component only having the data transmission channel with the first electronic device in the second usage mode.

12. The method of claim 9 further comprising:
after reading the first part of the target data and the first storage component and reading the second part of the target data from the second storage component, reconstructing the first part of the target data and the second part of the target data to obtain the target data.

13. The method of claim 9 further comprising:
after obtaining the target data writing task, generating first data configuration information for the to-be-written target data and dividing the to-be-written target data into the first part of the target data and the second part of the target data based on the first data configuration information.

14. The method of claim 9 further comprising:
after sending the target data reading task to the first electronic device, receiving second data configuration information generated and fed back by the first electronic device for the to-be- read target data and sharing the second data configuration information with the second electronic device, and receiving the first part of the target data read by the second electronic device from the first storage component and the second part of the target data read by the first electronic device from the second storage component to perform data reconstruction on the first part of the target data and the second part of the target data based on the second data configuration information to obtain the to-be-read target data.

15. A data reading and writing system comprising:
a first electronic device, the first electronic device having a first storage component and a second storage component; and
a second electronic device, the second electronic device being configured to establish a first communication connection with the first electronic device, and establish a data transmission channel with the first storage component, wherein:
when a target data reading/writing task is obtained from a third electronic device, the first storage component only has a data transmission channel with the second electronic device to transmit a first part of target data between the first storage component and the second electronic device through the second electronic device, the first part of the target data being a part of the target data required by the target data reading/writing task;
the first electronic device is configured to establish a first communication connection with the third electronic device to transmit a second part of target data between the second storage component and the third electronic device, the second part of the target data being a remaining part of the target data after removing the first part of the target data; and after completing the target data reading/writing task, the first electronic device is configured to control the first storage component to only have the data transmission channel with the first electronic device.

16. The system of claim 15 further comprising:
a switch arranged between the first electronic device, the first storage component and the second electronic device, the switch being configured to turn on or off the data transmission channel between the first electronic device and the first storage component, and the data transmission channel between the first storage component and the second electronic device.

17. The system of claim 16 further comprising:
a first communication interface arranged on the first electronic device, the first communication interface being configured to establish a second communication connection with the third electronic device.

18. The system of claim 17 further comprising:
a second communication interface arranged on the second electronic device, the second communication interface being configured to establish a first communication connection with the third electronic device.

* * * * *